J. W. POWERS.
Milk-Purifying and Cream-Raising Apparatus.

No. 224,844. Patented Feb. 24, 1880.

Attest
F. H. Schott
A. R. Brun

Inventor:
Jay W. Powers

UNITED STATES PATENT OFFICE.

JAY W. POWERS, OF PORTAGE, WISCONSIN, ASSIGNOR TO N. B. BLACKMER, OF SAME PLACE.

MILK-PURIFYING AND CREAM-RAISING APPARATUS.

SPECIFICATION forming part of Letters Patent No. 224,844, dated February 24, 1880.

Application filed December 19, 1879.

*To all whom it may concern:*

Be it known that I, JAY W. POWERS, of Portage, in the county of Columbia and State of Wisconsin, have invented a new and useful Improvement in Milk-Purifying and Cream-Raising Apparatus, of which the following is a full, clear, and exact description, reference being had to the accompanying drawings, forming a part of this specification, in which—

Figure 1:
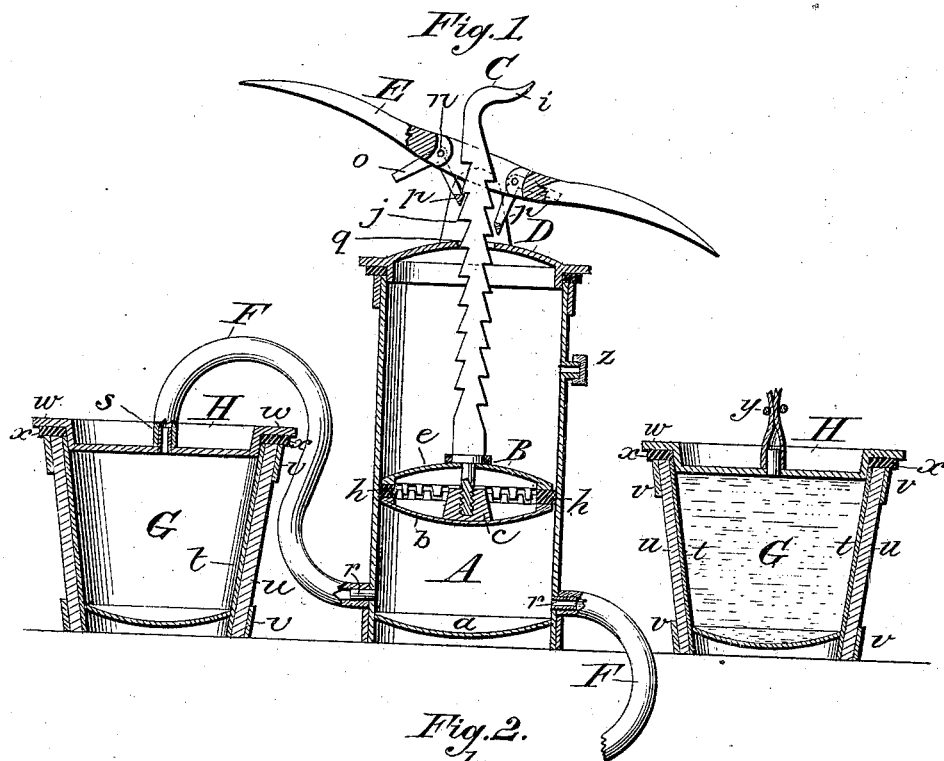
Figure 2:
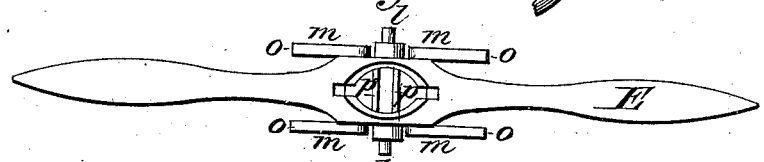
Figure 3:
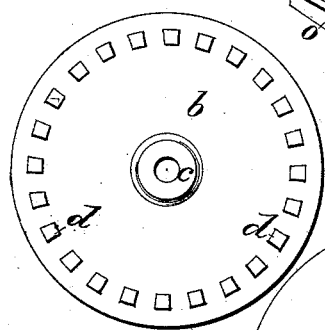
Figure 5:
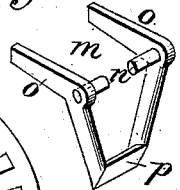
Figure 4:
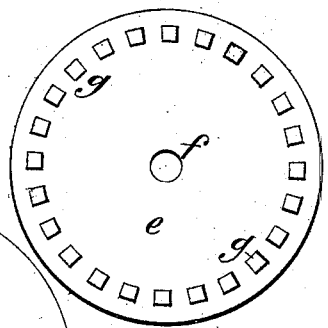
Figure 6:
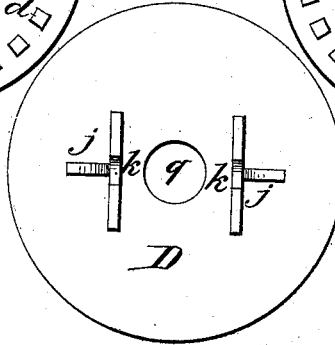

Figure 1 is a vertical section; Fig. 2, a top-plan view of the lever; Fig. 3, a top-plan view of the lower piston-plate; Fig. 4, a bottom-plan view of the upper piston-plate; Fig. 5, a detail, and Fig. 6 a top-plan view of the cover.

Heretofore the chief obstacles to successful butter-making have been that cows often secrete in their milk an unpleasant odor, called usually the "animal odor," which impairs the flavor of butter and detracts from its market value. At times the cows will take up through bad food, and deposit in their milk, noxious substances to such an extent often that serious results have followed its use, sickness and death having been traced to such sources.

It has recently been discovered that when milk is subjected to the influence of a vacuum the cream will more readily separate therefrom, and that a better and more uniform quality of butter may be produced.

I have now discovered that the unwholesome odors of milk referred to above are of a gaseous form, and that by subjecting the milk to the influence of a vacuum they may be entirely removed therefrom, and the milk thus purified becomes more valuable, not only for butter and cheese making, but for any and all purposes wherein it is employed; and it is the object of my present invention to provide a simple, cheap, and practical apparatus with which to apply the vacuum principle to domestic purposes.

My invention consists in the construction and combinations hereinafter more particularly set forth in the claims.

My invention is illustrated in detail in the accompanying drawings, wherein A is the exhaust-vessel or air-pump; B, the piston; C, the ratchet-bar; D, the cover; E, the lever; F, the connecting-tubes; G, the milk-receiving vessels, and H their covers.

The vessel A should be cylindrical in form and of uniform diameter throughout its entire length. It must be made of material sufficiently strong to resist an external atmospheric pressure of fifteen pounds to the square inch and perfectly air-tight. To this end it may be made of sheet metal heavy enough to sustain that pressure.

The bottom $a$, I make concave on its upper or inner surface to fit the convex piston B.

The piston B consists of an upper and lower plate, clasping at their periphery an elastic air-tight packing.

The lower plate, $b$, is provided at its center with a hub, $c$, extending upward, and near its periphery with a circle of upward-extending cogs or clutches; $d$. The hub $c$ is bored and threaded to receive the lower threaded end of the ratchet-bar C.

The upper piston-plate, $e$, is provided at its center with a round hole, $f$, through which the threaded end of the ratchet-bar passes loosely, and near its periphery with a circle of downward-extending cogs or clutches, $g$, corresponding in size and number with the cogs $d$ of the lower piston-plate, $b$, with which they interlock to prevent either plate from revolving independent of the other, and to form a recess outside of the cogs, between the plates, for the elastic packing $h$ to rest in.

One of the plates may be provided with the cogs or clutches described, and the other plate provided with holes or recesses corresponding in size and number with the cogs, so that when the two plates are drawn toward each other the cogs or clutches of the one would enter the holes or recesses in the other, thus forming the recess for the elastic packing $h$ similar to the construction described; or a ring may be cast on one plate and a corresponding channel or groove in the other for the purposes specified; but I prefer the interlocking cogs or clutches described.

The ratchet-bar C is provided at its upper end with an outward-extending arm, $i$, which serves as a lever to revolve it, but should be so shaped as to admit of its passing through the hole $q$ of the cover D and the opening in the lever E. At its lower end is a rounded projection, on the surface of which there are screw-threads to correspond with the screw-threads in the hub $c$ of the lower piston-plate, $b$, with which they engage, by means of which the two piston-plates are drawn toward each other, as will hereinafter be described.

D is a removable cover, having standards $j$ permanently attached thereto. $k$ are bearings at the top of the standards $j$.

E is the operating-lever, and at its center are pivots or trunnions $l$, the ends of which project horizontally some distance beyond the lever, so as to enter the bearings $k$ of the standards $j$. Between the pivots $l$ is a vertical opening in the lever, through which the ratchet-bar C passes freely in its upward and downward movements.

$m$ are pawls, pivoted into the lever E, one upon each side of the center, by means of the pins $n$, and $o$ are arms connected to the pawls $m$, which serve as weights to make the part $p$ of the pawls engage with the teeth on the bar C, and may be used also for the purpose of disengaging the pawls from the teeth of the bar C when desired.

The connecting-tubes F should be of rubber or other elastic substance which is impervious to air, and, if necessary to prevent their collapsing from the external atmospheric pressure when a vacuum is produced within the vessel A, wire coils may be inserted within them, which will still leave them elastic to a necessary degree. These tubes are attached to the exhaust-vessel or air-pump by placing them onto the outward-extending thimbles $r$ of the cylinder A, and to the milk-receiving vessels G by placing them onto or otherwise attaching them to the upward-extending thimbles $s$ of the covers H. The vessels G must also be capable of resisting an external pressure of fifteen pounds to the square inch.

The covers H are so constructed as to set down into the vessels G about an inch, so that their lower surfaces may rest upon or near the contents of the vessels, and are provided with outward-extending rims or flanges $w$, which rest upon and hold in proper position the intervenient rubber packing $x$. The covers are provided with the upward-extending thimbles, (to which the tubes F are attached,) and may, if necessary, be clamped down upon the vessels G, to render them air-tight, by any suitable mechanical device, which I do not deem it important to specify.

In operating my device the milk is deposited in the vessels G to within an inch of their tops. The covers H, attached to the connecting-tubes F, are then adjusted to position. The piston, with the ratchet-bar C loosened and the elastic packing $h$ relaxed, is lowered to the bottom of the exhaust-vessel A, the air which it displaces escaping outside its periphery. Then, by revolving the ratchet-bar C, the two plates are drawn toward each other by means of the screw-threads of the bar C engaging the screw-threads in the hub $c$ of the lower piston-plate, $b$, while the broader part of the bar C rests upon the upper surface of the upper piston-plate, $e$, thus distending the packing $h$.

It will be seen by this construction of a piston that no valves are employed, and the apparatus is not, therefore, liable to get out of order.

The cover D and lever E are already in position, as shown in Fig. 1, and as the opposite ends of the lever are alternately raised and depressed the pawls $m$ alternately engage with the ratchet-teeth on the bar C, and the piston is drawn up, forcing the air out of the vessel A through the hole $q$ of the cover D. Thus a vacuum is formed within the vessel A, the effect of which is transmitted to the vessels G and their contents by means of the connecting-tubes F.

When the milk has become purified and it is desired to remove any of the vessels to the factory or place where it is to be used, all that is necessary to do is to place the ligature $y$ upon the connecting-tube F, as shown in Fig. 1, sever the tube just above the ligature, and the vessel with its contents secured may be removed without disturbing the other vessels or interrupting the vacuum influence therein; or, when it is desired to remove the cream from any vessel, the tube thereof may be fastened in the manner described, the cover of the vessel removed, and the cream secured without disturbing in any manner the other vessels or their contents, and the vessels so removed may be refilled, their covers readjusted, and the ligatures removed, when their contents will be subjected to the influence of the vacuum the same as the vessels undisturbed.

Whenever the vacuum has become weakened or exhausted by the air drawn from the milk, ligatures may be placed upon all the connecting-tubes, the cap of the vent-tube removed, letting the air into the vessel A, when the piston, relieved of the atmospheric pressure, may be loosened, lowered again to the bottom of the vessel, tightened, and again drawn up, the ligatures removed, and the influence of the vacuum again communicated to the vessels G.

Having thus described my invention and set forth its advantages, what I claim as new, and desire to secure by Letters Patent, is—

1. The combination, with plates $b$ and $e$, provided with alternating series of projecting cogs, of the packing-gasket $h$ and the ratchet or piston rod C, having threaded end to clamp the plates together, substantially as described.

2. The combination, with plates $b$ and $e$, provided with alternating series of projecting cogs, of the packing-gasket $h$ and the ratchet or piston rod C, having threaded end to clamp the plates together, and the arm $i$, as set forth.

JAY W. POWERS.

Witnesses:
F. H. SCHOTT,
A. R. BROWN.